United States Patent [19]
Lamert et al.

[11] Patent Number: 5,668,426
[45] Date of Patent: Sep. 16, 1997

[54] ROTATIONAL FREQUENCY SENSING DEVICE WITH PULSE GENERATING WHEEL HAVING TWO-AXIAL POSITION SUPPORTING SLEEVE

[75] Inventors: Berthold Lamert, Fürth; Wolfgang Schmitt, Viernheim; Hans-Gerd Eckel, Laudenbach, all of Germany

[73] Assignee: Firma Carl Freudenberg, Weinheim, Germany

[21] Appl. No.: 376,261

[22] Filed: Jan. 23, 1995

[30] Foreign Application Priority Data

Jan. 31, 1994 [DE] Germany .................. 44 02 854.7

[51] Int. Cl.6 ............................................ G01P 3/44
[52] U.S. Cl. ................. 310/168; 310/166; 310/171; 384/484; 384/448; 277/35; 277/37
[58] Field of Search ............................. 310/168, 166, 310/171; 384/448, 484; 277/37, 153, 35, 152

[56] References Cited

U.S. PATENT DOCUMENTS

| | | |
|---|---|---|
| 3,500,091 | 3/1970 | Jones . |
| 4,988,220 | 1/1991 | Christiansen et al. ........... 384/448 |
| 5,015,001 | 5/1991 | Jay ............................... 277/37 |
| 5,085,519 | 2/1992 | Dougherty ...................... 384/448 |
| 5,166,611 | 11/1992 | Kujawa, Jr. et al. ............. 324/166 |
| 5,195,830 | 3/1993 | Caillault et al. ................. 384/448 |
| 5,234,269 | 8/1993 | Grillo et al. .................... 384/446 |
| 5,244,215 | 9/1993 | Cather, Jr. et al. .............. 277/1 |
| 5,292,199 | 3/1994 | Hosbach et al. ................. 384/478 |
| 5,476,272 | 12/1995 | Hixson, II ....................... 277/152 |
| 5,492,417 | 2/1996 | Baker et al. ..................... 384/448 |

FOREIGN PATENT DOCUMENTS 19 11 513  5/1976  Germany .

*Primary Examiner*—Steven L. Stephan
*Assistant Examiner*—Tran N. Nguyen
*Attorney, Agent, or Firm*—Kenyon Kenyon

[57] ABSTRACT

A pulse generating wheel, combined with a radial shaft sealing ring, for a machine element that can rotate about an axis. The pulse generating wheel has a cylindrical sleeve that can be slid onto the machine element. The radial shaft sealing ring is provided with a sealing lip, made of polymer material, that is delimited on the side facing the atmosphere by a conical surface. In a first axial position of the cylindrical sleeve, the conical surface is contacted by the cylindrical sleeve and can be expanded in the radial direction. The cylindrical sleeve can be displaced out of the first axial position into a second axial position in which the sealing lip moves into direct contact with the machine element, and the cylindrical sleeve is at an axial distance from the conical surface.

15 Claims, 4 Drawing Sheets

ROTATIONAL FREQUENCY SENSING DEVICE WITH PULSE GENERATING WHEEL HAVING TWO-AXIAL POSITION SUPPORTING SLEEVE

BACKGROUND OF THE INVENTION

This invention relates to a rotational frequency sensing device comprising a pulse generating wheel, combined with a radial shaft sealing ring, for a machine element that can rotate about an axis.

A rotational frequency sensing device of this kind is known from U.S. Pat. No. 3,500,091 (corresponding to German Patent 19 11 513), the disclosure of which is hereby incorporated herein by reference. In that patent, arranged between the sealing lip of the radial shaft sealing ring 64 and the machine element 12 (on which a wheel is mounted for relative rotation) is a cylindrical sleeve 28 that contains a receptacle for the sensor 44, the pulse generating wheel being fastened to the radial shaft sealing ring 64. This configuration is difficult to manufacture and is sensitive to external damage which may impair its function.

SUMMARY OF THE INVENTION

The underlying object of the invention is to provide a rotational frequency sensing device incorporating a pulse generating wheel, combined with a radial shaft sealing ring, that is easy to manufacture and install and moreover is characterized by particularly good functional reliability.

According to the invention, this object is achieved by a pulse generating wheel, combined with a radial shaft sealing ring, for a machine element that can rotate about an axis, in which the pulse generating wheel has a cylindrical sleeve that can be slid onto the machine element. The radial shaft sealing ring is provided with a sealing lip, made of polymer material, that has a conical surface on the side facing the atmosphere. The radial shaft sealing ring can be elastically expanded in the radial direction. In a first axial position of the cylindrical sleeve, the sealing lip is contacted by the cylindrical sleeve. The cylindrical sleeve can be displaced out of the first axial position into a second axial position in which position the sealing lip comes into direct contact with the machine element and the cylindrical sleeve is at an axial distance from the conical surface.

As delivered (prior to installation), the radial shaft sealing ring and pulse generating wheel constitute a self-contained module that is particularly insensitive to mechanical damage. Installation of the module requires no prior disassembly. Installation is particularly easy if the inside diameter of the sealing lip is elastically expanded by the cylindrical sleeve to a diameter which is approximately identical to that of the machine element, or is slightly greater than it. As a result, the sealing lip can be slid with particular ease, and without the risk of damage, onto the machine element being sealed. This is of great advantage with regard to the mass production of products.

In a first embodiment, in the first axial position of the cylindrical sleeve, the cylindrical sleeve can completely overlap the sealing lip in the axial direction. When the radial shaft sealing ring is slid onto the machine element being sealed, which can be a shaft end, with this type of embodiment the machine part contacts the cylindrical sleeve prior to contacting the sealing lip. As a result, the sealing lip is protected from damage by the machine part. During installation, the cylindrical sleeve is transferred from its first axial position into its second axial position in which it is at an axial distance from the conical surface of the sealing lip. As a result the sealing lip is released from its outward expansion by the cylindrical sleeve and comes into direct contact with the surface of the machine element being sealed, in which position it can be utilized in accordance with its intended sealing function.

The sealing lip of the radial shaft sealing ring is made of polymer material, for example rubber or polytetrafluoroethylene (PTFE). Because such materials are susceptible to relaxation, expansion of the sealing lip to a diameter which is greater than that of the machine element being sealed must be monitored and limited to a value that still reliably ensures that the minimum pressure required to achieve a good sealing result is applied against the machine element being sealed. For this reason, a cylindrical sleeve in the above-mentioned embodiment with an inside diameter which is greater than that of the machine element must have only a small wall thickness in the radial direction. An individual determination of dimension requirements for particular applications can be made on the basis of simple tests.

In another embodiment of the invention, the cylindrical sleeve can be designed so that it does not completely overlap the sealing lip. The cylindrical sleeve can be made comparatively shorter in the axial direction, and comparatively thicker in the radial direction, than the embodiment described above, i.e. substantially more sturdy mechanically, if it contacts the conical surface of the sealing lip in the first position at an axial distance T from the radially inner delimiting edge of the sealing lip. The sealing lip has a comparatively larger diameter at this point of contact with the cylindrical sleeve than at its radially inner edge. This kind of embodiment nevertheless results in outstanding radial bracing of the sealing lip by the cylindrical sleeve during storage and as installation begins. Thus, even with such an embodiment, it is not necessary to expand the sealing lip in the radial direction by the machine element as installation begins to the extent required by prior art devices. Thus, the associated latent danger of damage to the inner delimiting edge of the sealing lip, particularly important for sealing, is avoided. Advantageously, the distance T should be such that, when the cylindrical sleeve is in the first position, the inner delimiting edge and the machine element have a substantially identical diameter.

It is also possible for the cylindrical sleeve to consist of spring tongues distributed in the circumferential direction and projecting in the axial direction, which spring tongues can move in the radial direction independently of one another. In the root region of the spring tongues (i.e., at the base of the spring tongues), the cylindrical sleeve can have an inside diameter which is adapted to that of the machine element being sealed, in order to guarantee proper centering of the preassembled pulse generating wheel. Preferably the spring tongues are dimensioned, and matched to the elasticity of the material composing them, in such a way that during storage of the radial shaft sealing ring the inner delimiting edge of the sealing lip is kept to a diameter which is identical to that of the machine element being sealed or is even slightly less or greater. As described above with the previous embodiment, this eliminates undesired relaxation phenomena in the sealing lip during long periods of storage. The mechanical strength of the spring tongues can nevertheless be considerable, and can correspondingly increase the mechanical strength of the sealing lip during installation. This substantially simplifies the use of automatic machinery to perform installation. In this context, in installation the front end of the spring tongues is slid onto the end of the machine element being sealed, resulting in radial expansion of the sealing lip. This is effective only until the cylindrical sleeve has been transferred into its second position, and in this short period of time the expansion of the sealing lip cannot lead to the occurrence of relaxation phenomena in the sealing material constituting the sealing lip. The spring tongues can be of any length. They can also be dimensioned so that the sealing lip is completely overlapped by the spring tongues in the first position of the cylindrical sleeve.

The cylindrical sleeve can be transferred particularly easily from its first axial position into the second position if it is provided with a prolongation that overlaps at least a portion of the machine element in the region of its end surface. The prolongation can consist of a flange that can be clamped between the machine element and a secondary element which can be joined thereto. It ensures that no further axially directed relative displacement is possible during ordinary operational use. This is of great advantage for correct detection of the signals produced by the pulse generating wheel.

The cylindrical sleeve can be joined to an annular section which partly overlaps the radial shaft sealing ring on the outside, at least in the first position. The annular section can have a hollow cylindrical shape, and can be provided with pulse generating mechanisms regularly distributed in the circumferential direction. Such pulse generating mechanisms can be, for example, wall openings which can be detected by sensors. They may also consist of magnetic poles with alternating polarization effect, distributed in the circumferential direction. With these pulse generating mechanisms, relative rotations and changes in the rotation speed of the machine part being sealed can be particularly reliably detected.

A self-contained functional module is obtained if the radial shaft sealing ring is joined to a sensor that overlaps the annular section of the cylindrical sleeve at least at one peripheral point and can be activated by the pulse generating mechanisms of the annular section. It is characterized by particularly good operating reliability if the radial shaft sealing ring is provided with a retaining flange that projects radially outward, such that the retaining flange can be fastened by means of a stiffening flange that already contains the sensor. The retaining flange can, for example, be made of diecast aluminum, and can enclose the entire module externally and protect it from the outside.

Each of FIGS. 1 to 4 shows only one side of the configuration depicted, in lengthwise section.

DETAILED DESCRIPTION OF THE DRAWINGS

Figure 1:
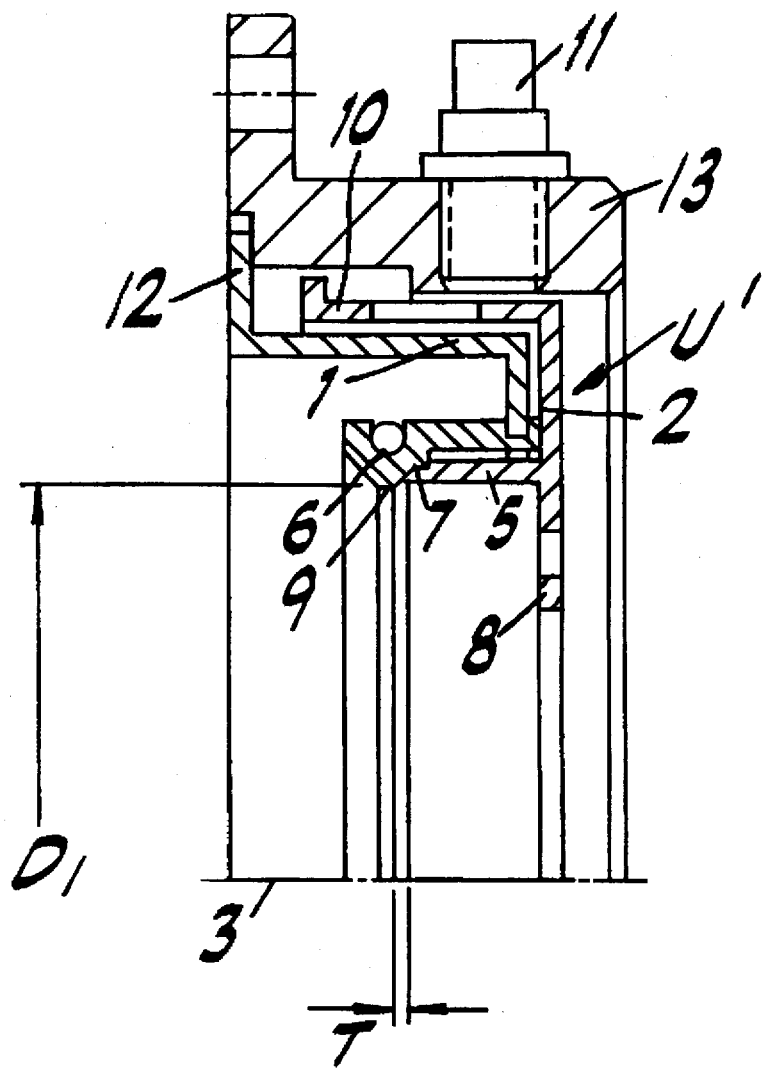
FIG. 1 shows a first embodiment of a pulse generating wheel combined with a radial shaft sealing ring, in which the cylindrical sleeve is in the first position.
Figure 2:
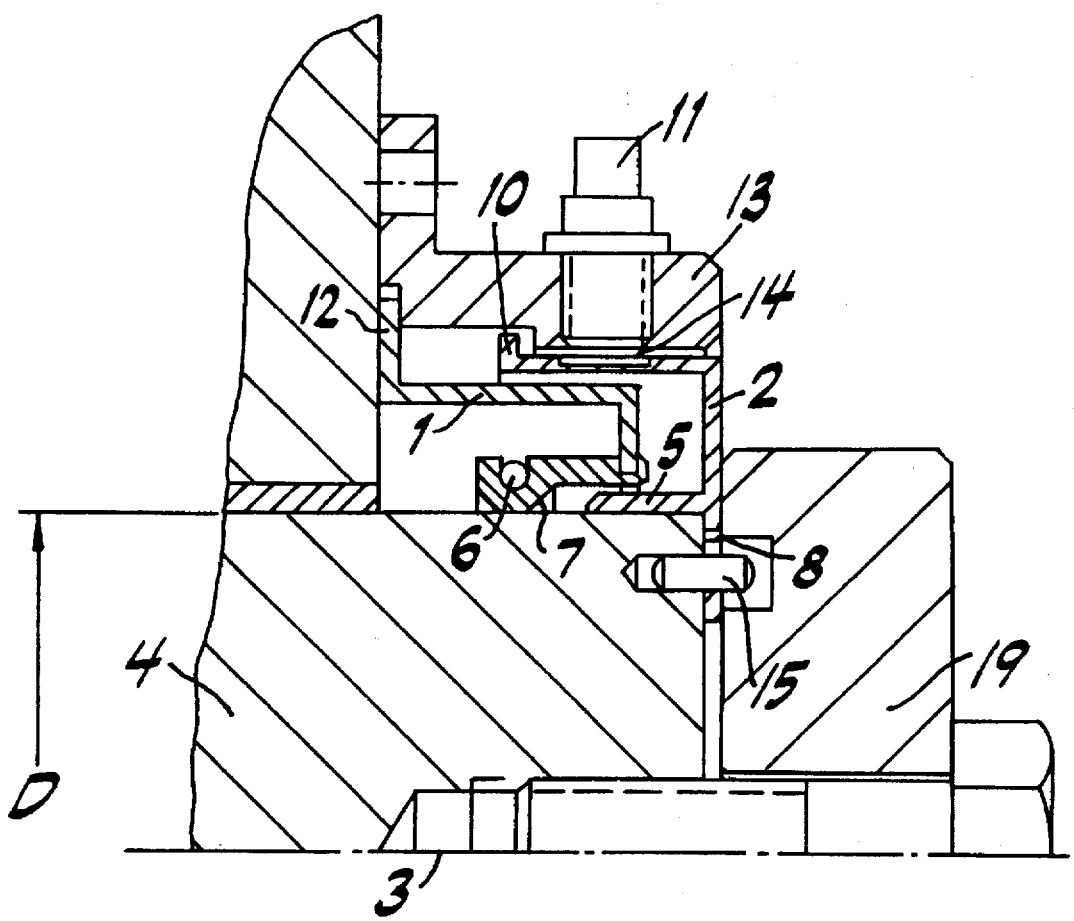
FIG. 2 shows the embodiment of FIG. 1, in which the cylindrical sleeve is in the second position.

FIGS. 1 and 2 show a pulse generating wheel 2, combined with a radial shaft sealing ring 1, for a machine element 4 that can rotate about an axis 3. The pulse generating wheel 2 has a cylindrical sleeve 5 which can be slid manually onto machine element 4. Radial shaft sealing ring 1 is provided with a sealing lip 6 made of polymer material, which on the side facing the atmosphere (i.e. radially inwardly) has a conical surface 7.

FIG. 1 shows the cylindrical sleeve 5 in the first axial position. In this position, the sealing lip 6 is contacted by the cylindrical sleeve 5 and is expanded in the radial direction to an inside diameter D1 that is substantially identical to the outside diameter D of machine element 4 (see FIG. 2) that is to be sealed during ordinary operational use. As a result, the radially inner delimiting edge 9 of the sealing lip 6 is not exposed to any particularly high mechanical load during installation. Thus damage is easily prevented.

The axial spacing T which exists, in the first position, between the front end of cylindrical sleeve 5 and inner delimiting edge 9 of sealing lip 6, is dimensioned, and brought into congruence with the inclination angle of conical surface 7, in such a way that no appreciable expansion of diameter D1 beyond diameter D occurs during storage. Relaxation phenomena in the polymer material constituting sealing lip 6 during storage are thereby largely avoided. A good sealing effect is achieved immediately after the seal is put into service.

Cylindrical sleeve 5 is provided at the right-hand end of its profile with a prolongation 8, projecting radially inward. The prolongation 8 overlaps a portion of machine element 4 in the region of its end surface after installation, and ensures that during installation cylindrical sleeve 5 is transferred reliably from its first position (FIG. 1) into its second position (FIG. 2). In the second position, depicted in FIG. 2, the cylindrical sleeve 5 is displaced at a distance from conical surface 7. Sealing lip 6 is thereby relaxed, with the result that it is pressed directly against the machine element 4 with the pressure provided for sealing. Frictional heat occurring during ordinary operational use in the region of the sealing gap can thus be easily dissipated via machine element 4.

In the first position of cylindrical sleeve 5, the pulse generating wheel 2 and radial shaft sealing ring 1 are in axially abutting contact, which prevents relative displacement. The area at which such contact occurs is marked U' in FIG. 1. After cylindrical sleeve 5 has been transferred into the second position (FIG. 2), no such contact exists between pulse generating wheel 2 and radial shaft sealing ring 1. As a result, the two parts are capable of relative rotation. Subsequent axially directed relative displacement of the two parts with respect to one another is no longer possible, since pulse generating wheel 2 is clamped between the end surface of machine element 4 on the one hand and the bolted-on secondary element 19 on the other hand. As described above, for this purpose, cylindrical sleeve 5 is provided with a prolongation 8 which overlaps part of machine element 4 in the region of its end surface and is configured as a flange. The sealing lip 6 constitutes a component of the radial shaft sealing ring, and is nondisplaceably associated with the machine element 4 being sealed.

Cylindrical sleeve 5 is joined to an annular section 10 which partly overlaps radial shaft sealing ring 1 externally in the first position and is configured as a hollow cylinder. The annular section is provided externally with pulse generating mechanisms 14 distributed regularly in the circumferential direction, for example openings, which can be moved past a sensor 11 with a close radial spacing. The sensor 11 is mounted in stiffening flange 13, which completely surrounds the hollow cylinder externally and makes it possible to clamp the radially outwardly projecting retaining flange 12 of the radial shaft sealing ring 1 to a housing wall of machine element 4, capable of relative rotation. The housing wall can, for example, be a motor housing. A dowel pin 15 provides additional immobilization to prevent relative rotation of pulse generating wheel 2 with respect to machine element 4.

Figure 3:
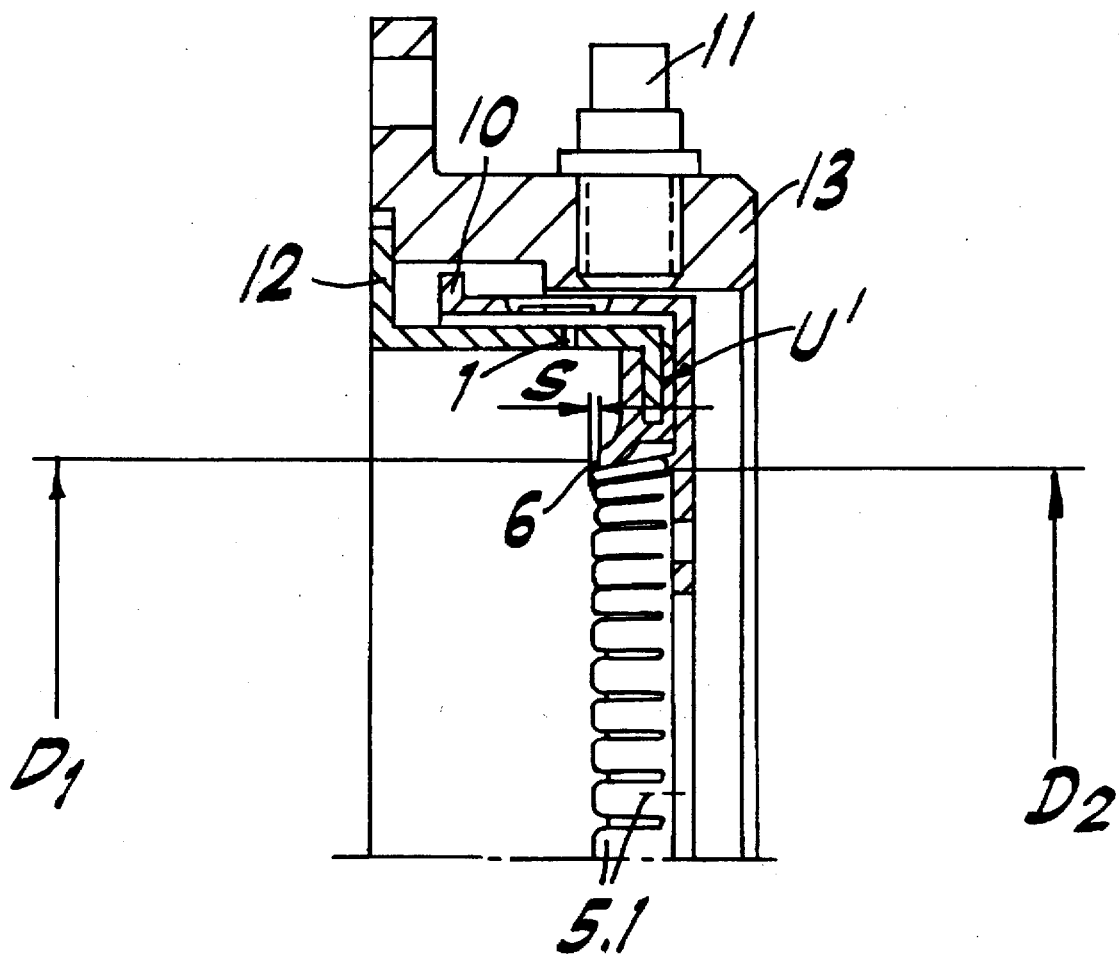
FIG. 3 shows a second embodiment of a pulse generating wheel combined with a radial shaft sealing ring, in which the cylindrical sleeve is in the first position.
Figure 4:
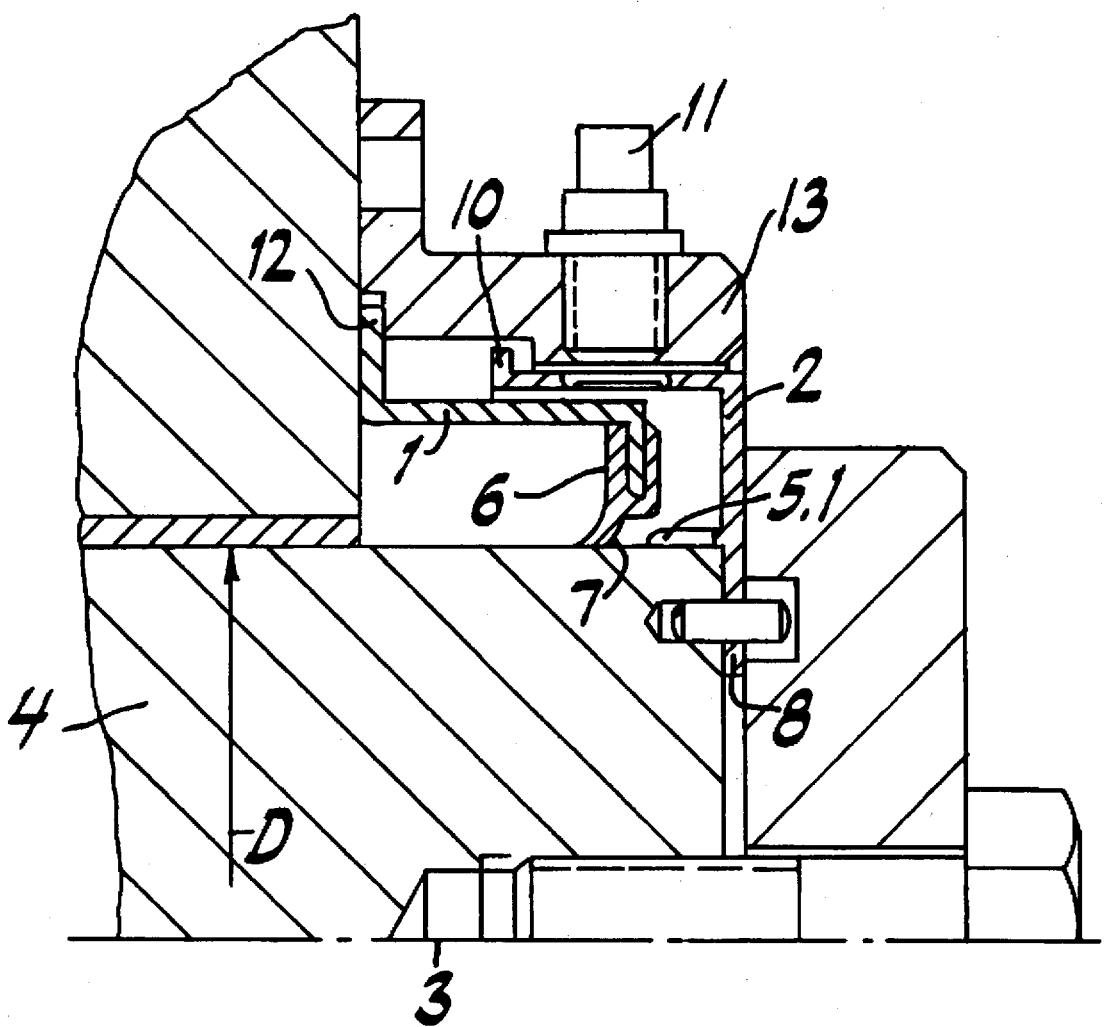
FIG. 4 shows the embodiment of to FIG. 3, in which the cylindrical sleeve is in the second position.

FIGS. 3 and 4 depict an embodiment that is similar in many elements to the one described above. Sealing lip 6, however, is made not of rubber, as described above, but of PTFE, and is braced against a cylindrical sleeve 5 consisting of spring tongues 5.1 regularly distributed in the circumferential direction. Spring tongues 5.1 are dimensioned so that in the first position, cylindrical sleeve 5 completely overlaps sealing lip 6 over its entire axial length and extends beyond sealing lip 6 by a small amount S. Cylindrical sleeve 5 braces sealing lip 6 on an inside diameter D1 that is substantially identical to diameter D of machine element 4 being sealed during ordinary operational use. The result is a radially inwardly directed elastic deformation of spring tongues 5.1 by action of the sealing lip 6. The spring tongues 5.1 have at their root an inside diameter D2 that is slightly greater than the outside diameter D of machine element 4 being sealed. Cylindrical sleeve 5 formed by spring tongues 5.1 can thus easily be slid, for installation purposes, onto the end-surface chamfer of machine element 4 being sealed, resulting in a radial expansion of sealing lip 6. At the same time, cylindrical sleeve 5 returns to its cylindrical shape (FIG. 4) which it received when manufactured. It is rounded on the inside and outside in the region of the projecting end in order not only to simplify sliding onto machine element 4, but also to exclude damage to sealing lip 6 upon insertion into its inside diameter.

As the process of fitting onto the end of machine element 4 being sealed continues, the inwardly projecting prolongation 8 of pulse generating wheel 2 comes into engagement with the end surface of machine element 4, which prevents any further relative displacement in the axial direction. The result of the axially directed fitting forces introduced via stiffening flange 13 and retaining flange 12 into radial shaft sealing ring 1 is therefore that the sealing lip slides down from cylindrical sleeve 5 and comes into directly engaged contact with machine element 4 being sealed. With radial shaft sealing ring 1 in its finally defined position, the result is an axial spacing between cylindrical sleeve 5 and conical surface 7 of sealing lip 6. Any damage to sealing lip 6 by cylindrical sleeve 5 during ordinary operational use is thus avoided.

In the embodiment shown in FIGS. 3 and 4, pulse generating wheel 2 is again surrounded and protected over its entire outer circumference by a stiffening flange 13. The latter also contains a sensor 11 capable of detecting the rotation speed of machine element 4.

We claim:

1. A rotational frequency sensing device for a machine element rotatable about an axis, said device comprising a pulse generating wheel and a radial shaft sealing ring;

wherein the pulse generating wheel has a cylindrical sleeve that is slid onto the machine element;

wherein the radial shaft sealing ring is provided with a sealing lip made of polymer material, the sealing lip having a radially inwardly directed conical surface;

wherein the cylindrical sleeve has a first axial position and a second axial position;

wherein in the first axial position of the cylindrical sleeve, the conical surface is contacted by the cylindrical sleeve and is expanded in the radial direction; and wherein in the second axial position of the cylindrical sleeve, the cylindrical sleeve is at an axial distance from the conical surface and the sealing lip is in direct contact with the machine element.

2. The device of claim 1, wherein in the first axial position, the cylindrical sleeve completely overlaps the sealing lip in the axial direction.

3. The device of claim 1, wherein in the first axial position, the cylindrical sleeve contacts the conical surface at an axial distance from an inner delimiting edge of the sealing lip.

4. The device of claim 3, wherein the axial distance is such that, in the first axial position, the inner delimiting edge has a diameter substantially identical to a diameter of the machine element.

5. The device of claim 1, wherein the cylindrical sleeve comprises spring tongues distributed circumferentially and projecting in the axial direction, wherein the spring tongues move in the radial direction independently of one another.

6. The device of claim 1, wherein the cylindrical sleeve has a prolongation that overlaps at least a portion of the machine element in the region of an end surface of the machine element.

7. The device of claim 5, wherein the cylindrical sleeve has a prolongation that overlaps at least a portion of the machine element in the region of an end surface of the machine element.

8. The device of claim 6, wherein the prolongation comprises a flange and wherein the flange is clamped between the machine element and a secondary element which can be joined thereto.

9. The device of claim 7, wherein the prolongation comprises a flange and wherein the flange can be clamped between the machine element and a secondary element which is joined thereto.

10. The device of claim 1, wherein the cylindrical sleeve is joined to an annular section which partly overlaps the radial shaft sealing ring on the outside, at least in the first axial position.

11. The device of claim 5, wherein the cylindrical sleeve is joined to an annular section which partly overlaps the radial shaft sealing ring on the outside, at least in the first axial position.

12. The device of claim 10, wherein the radial shaft sealing ring is joined to a sensor that overlaps the annular section at least at one peripheral point and is activated by the annular section.

13. The device of claim 11, wherein the radial shaft sealing ring is joined to a sensor that overlaps the annular section at least at one peripheral point and is activated by the annular section.

14. The device of claim 12, wherein the radial shaft sealing ring is provided with a retaining flange that projects radially outward and wherein the retaining flange is fastened to a stiffening flange that contains the sensor.

15. The device of claim 13, wherein the radial shaft sealing ring is provided with a retaining flange that projects radially outward and wherein the retaining flange is fastened to a stiffening flange that contains the sensor.

* * * * *